E. E. ROSAIRE
METHOD OF DETERMINING THE STRAIGHTNESS OF DRILL HOLES IN THE EARTH
Aug. 9, 1932. Re. 18,565
Original Filed Jan. 5, 1929
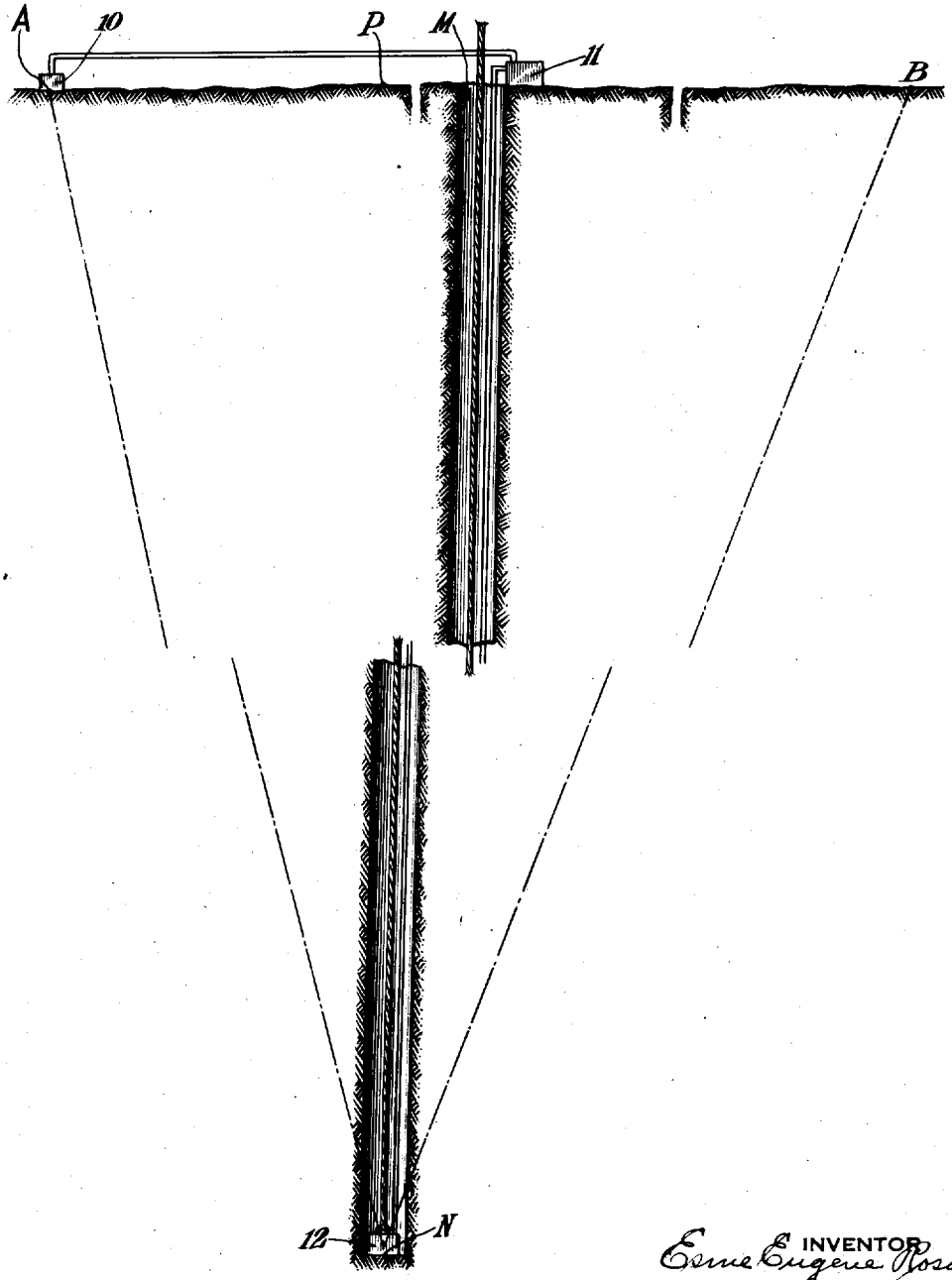
INVENTOR
Ernest Eugene Rosaire
BY Kenyon & Kenyon
ATTORNEY Reissued Aug. 9, 1932 Re. 18,565

UNITED STATES PATENT OFFICE

ESME EUGÈNE ROSAIRE, OF HOUSTON, TEXAS, ASSIGNOR TO GEOPHYSICAL RESEARCH CORPORATION, OF NEW YORK, N. Y., A CORPORATION OF NEW JERSEY

METHOD OF DETERMINING THE STRAIGHTNESS OF DRILL HOLES IN THE EARTH

Original No. 1,811,648, dated June 23, 1931, Serial No. 330,542, filed January 5, 1929. Application for reissue filed April 19, 1932. Serial No. 607,207.

This invention relates to a method of determining the straightness of drill holes in the earth. When drilling deep holes into the earth in search of oil and gas, it is not an uncommon experience to find that such holes, instead of going straight downward are often crooked and deviate to a considerable extent from vertical. In some instances, it has been found that the bottoms of holes 4,000 feet deep are laterally offset as much as 800 feet from the vertical line passing through the top of the hole. So large a deviation may easily defeat the purpose of drilling a well in that the anticipated oil producing formation may be missed completely. In addition, such a deviation leads to ambiguous conclusions which may cause additional wells to be grossly mislocated.

Methods which have previously been used to determine the straightness of drill holes have not been satisfactory, due to the fact that the position of any point in the bore hole has been determined by the accumulated result of a series of observations. Any slight consistent error in these observations will be cumulative and as a result give a very erroneous value for the location of any point in the bore hole.

The object of this invention is a method of determining the straightness of drill holes in which the observation is taken directly at the point in question and any error in location will be directly proportional to the observation error and will not be cumulative.

According to the present invention, the location of the bottom of a drill hole or any point along the hole relative to two or more points on the surface is determined by the difference in time required for mechanical or sound waves to travel through the earth from the several points on the surface to the points in the drill hole or from points in the drill hole to points on the surface.

In the accompanying drawing, the single figure indicates a section through a drill hole, the deviation of which from vertical is to be determined.

A and B represent two points on the earth's surface. M designates the mouth of a drill hole and N designates the bottom of such drill hole, while P indicates the point on the earth's surface vertically above the point N. The mechanical or sound waves to be used in determining the position of the point N are preferably produced by setting off an explosive charge, means for setting off such charge being indicated by the reference character 10. An oscillograph recorder 11 is electrically connected to such means in such a way that its circuit is disturbed at the time that the explosion occurs. This results in the recording of the time of explosion on the uniformly moving film of the recorder. A geophone or other suitable detector 12 is electrically connected to the oscillograph. When a disturbance arrives at the geophone, electrical impulses are generated which are also recorded by the oscillograph, due to the electrical connections between the two instruments.

With the geophone located at the point N, an explosive charge set off at the point A produces an indication on the oscilograph of the time of the explosion and the arrival of the waves at the point N produces another indication on the oscillograph by means of which the time of travel of the waves from the point A to the point N may be determined. In a similar manner, the time of travel of sound waves from the point B to the point N may be determined. If a disturbance is produced at A and received at N and the time of travel from AN noted by means of the oscillograph and a similar disturbance is produced subsequently at B and other similar points and the times of travel observed, a determination may be made of the position of the point N relative to the various points at which the explosive charges were set off. The point N will be nearer A than B if the time of travel from A to N is less than the time of travel from B to N and vice versa. If the velocity of travel of the waves 11 is known, the distance AN and BN may be calculated and the position of the point N relative to the points A and B can be determined. Likewise, the position of N may be determined relative to the other points and its location fixed.

The determination of the position of the point N may be materially expedited by locating the points A and B on a line passing through the axis of the bore hole and preferably arranging such points at opposite sides of the bore hole equally distant therefrom. Under such circumstances, after the distances AN and BN have been calculated, the triangle ABN can be determined and the point N located relatively to the line AMB. Then, by repeating the operation described with two similar surface points situated on another line passing through N, the position of the point N with respect to the line connecting these two points may be determined and the position of the point definitely fixed.

Moreover, where the distance MN is known, the lateral shift of the point N relative to the point M may be determined approximately by the following equation:

$$X=\left(\frac{T_a^2-T_b^2}{T_a^2+T_b^2}\right)\left(\frac{\overline{MN}^2+\overline{AM}^2}{2AM}\right)$$

in which X is the projection on the line AB of the distance MP, $T_a$ is the time of travel from A to N and $T_b$ is the time of travel from B to N. If the two lines on which the points of explosion have been selected are perpendicular to each other, the resultant of the two values of X determined by means of the above equation will give the exact location of the point P and by finding the location of a plurality of points at different depths the deviation of the drill hole from vertical may be determined. The distance PN, that is, the vertical distance from the earth's surface to the geophone 12, may be determined by means of the geometrical proposition that the square of the hypothenuse of a right triangle is equal to the sum of the squares of the other two sides. After the point P has been located, the distance PM is known and the distance MN is known from the length of the cable let down into the bore. Therefore, the distance PN can be determined in this way and the deviation at any depth may be determined.

By taking measurements from more than two points on each line as AMB, the position of the point N can be determined without knowing the depth of the hole or the velocity of propagation of the waves. This is done by algebraically determining the best hyperbola for the points on a graph obtained by plotting horizontal distances along the line AMB as abscissæ travel times as ordinates for the several points. The abscissa of the minimum time point on the hyperbola gives the horizontal position of N. In practice, it is customary to take from six to twelve points along the line AMB as successive sources of sound and respectively observing the travel times. The observed data is plotted on a graph as above described and the best hyperbola is obtained by algebraic determination and the use of the method of least squares in the calculations.

Although it is preferable to select points of explosion lying on perpendicular lines intersecting the axis of the bore hole, the method above described may be used with explosion points selected at random with respect to the bore hole. It is necessary only to determine the times of travel between several points on the earth's surface and the point the position of which is to be determined. Then, as above outlined, the position of the point in the bore hole may be determined relative to the several points on the earth's surface. By determining the positions of a plurality of points in the bore hole, the deviation from vertical of a bore hole may readily be determined.

An alternative method of determining the positions of several points in a bore hole is to produce explosions at the several points and measure the time intervals required for the waves thus formed to be received at selected points on the earth's surface. The positions of the points in the bore hole relative to the selected points on the earth's surface and the deviation from vertical of the bore hole may then be determined as above described.

I claim:

1. The method of determining the deviation from vertical of a bore formed in the earth which comprises causing sound waves to traverse the sub-surface formation intermediate different points on the earth's surface and a selected point in the bore below the earth's surface and recording the time intervals required by the sound waves to traverse the different paths between said points.

2. The method of determining the deviation from vertical of a bore formed in the earth which comprises causing sound waves to traverse the sub-surface formation intermediate points on the earth's surface equidistant from the bore and a selected point in the bore below the earth's surface and recording the time intervals required by the sound waves to traverse the different paths between said points.

3. The method of determining the deviation from vertical of a bore formed in the earth which comprises causing sound waves to transverse the sub-surface formation intermediate points on the earth's surface lying on a line intersecting said bore and a selected point in the bore below the earth's surface and recording the time intervals required by the sound waves to traverse the different paths between said points.

4. The method of determining the deviation from vertical of a bore formed in the earth which comprises causing sound waves to traverse the sub-surface formation intermediate points on the earth's surface equidistant from said bore and lying on a line intersecting said bore and a selected point in the bore below the earth's surface, and recording the time intervals required by the sound waves to traverse the different paths between said points.

5. The method of determining the deviation from vertical of a bore formed in the earth which comprises causing sound waves to traverse the sub-surface formation intermediate points on the earth's surface lying on perpendicular lines intersecting said bore and a selected point in the bore below the earth's surface, and recording the time intervals required by the sound waves to traverse the different paths between said points.

6. The method of determining the deviation from vertical of a bore formed in the earth which comprises causing sound waves to traverse the sub-surface formation intermediate points on the earth's surface equidistant from the bore and lying on perpendicular lines intersecting said bore, and a selected point in the bore below the earth's surface, and recording the time intervals required by the sound waves to traverse the different paths between said points.

7. The method of determining the deviation from vertical of a bore formed in the earth which comprises causing sound waves to traverse the sub-surface formation intermediate points on the earth's surface and selected points in the bore below the earth's surface, recording the time intervals required by the sound waves to traverse the different paths between said points and calculating the positions of the selected points from said recorded time intervals, the known distances of said surface points from the mouth of the bore and the known distances of the selected points from the mouth of the bore.

8. The method of determining the deviation from vertical of a bore formed in the earth which comprises producing sound waves at different points on the earth's surface and recording the time intervals required by the sound waves to travel through the earth from said surface points to a selected point in the bore below the earth's surface.

9. The method of determining the deviation from vertical of a bore formed in the earth which consists in producing sound waves at points on the earth's surface equidistant from the bore, and recording the time intervals required by the sound waves to travel through the earth from said surface points to a selected point in the bore below the earth's surface.

10. The method of determining the deviation from vertical of a bore formed in the earth which consists in producing sound waves at points on the earth's surface lying on a line intersecting said bore, and recording the time intervals required by the sound waves to travel through the earth from said surface points to a selected point in the bore below the earth's surface.

11. The method of determining the deviation from vertical of a bore formed in the earth which consists in producing sound waves at points on the earth's surface equidistant from said bore and lying on a line intersecting said bore, and recording the time intervals required by the sound waves to travel through the earth from said surface points to a selected point in the bore below the earth's surface.

12. The method of determining the deviation from vertical of a bore formed in the earth which consists in producing sound waves at points on the earth's surface lying on perpendicular lines intersecting said bore, and recording the time intervals required by the sound waves to travel through the earth from said surface points to a selected point in the bore below the earth's surface.

13. The method of determining the deviation from vertical of a bore formed in the earth which consists in producing sound waves at points on the earth's surface equidistant from the bore and lying on perpendicular lines intersecting said bore and recording the time intervals required by the sound waves to travel through the earth from said surface points to a selected point in the bore below the earth's surface.

14. The method of determining the deviation from vertical of a bore formed in the earth which comprises producing sound waves at points on the earth's surface, recording the time intervals required by the sound waves to travel through the earth from said surface points to selected points in the bore below the earth's surface, and calculating the positions of said last named points from said recorded time intervals, the known distances of said surface points from the mouth of the bore and the known distances of the selected points from the mouth of the bore.

15. The method of determining the deviation from vertical of a bore formed in the earth which comprises creating sound waves at a point in the bore, receiving said waves at different points on the earth's surface and recording the time intervals required by the waves to travel through the earth from said point in the bore to the points on the earth's surface.

16. The method of determining the deviation from vertical of a bore formed in the earth which comprises creating sound waves at a point in the bore, receiving the waves at points on the earth's surface equi-distant from the bore and recording the time intervals required by the waves to travel through the earth from said point in the bore to the points on the earth's surface.

17. The method of determining the deviation from vertical of a bore formed in the earth which comprises creating sound waves at a point in the bore, receiving the waves at points on the earth's surface lying on a line intersecting said bore and recording the time intervals required by the waves to travel through the earth from said point in the bore to the points on the earth's surface.

18. The method of determining the deviation from vertical of a bore formed in the earth which comprises creating sound waves at a point in the bore, receiving waves at points on the earth's surface equi-distant from said bore and lying on a line intersecting said bore and recording the time intervals required by the waves to travel through the earth from said point in the bore to the points on the earth's surface.

19. The method of determining the deviation from vertical of a bore formed in the earth which comprises creating sound waves at a point in the bore, receiving the waves at points on the earth's surface lying on perpendicular lines intersecting said bore and recording the time intervals required by the waves to travel through the earth from said point in the bore to the points on the earth's surface.

20. The method of determining the deviation from vertical of a bore formed in the earth which comprises creating sound waves at a point in the bore, receiving the waves at points on the earth's surface equi-distant from the bore and lying on perpendicular lines intersecting said bore and recording the time intervals required by the waves to travel through the earth from said point in the bore to the points on the earth's surface.

21. The method of determining the deviation from vertical of a bore formed in the earth which comprises creating sound waves at selected points in the bore, receiving waves at points on the earth's surface, recording the time intervals required by the waves to travel from said points in the bore to said points on the earth's surface and calculating the positions of said points in the bore from said recorded time intervals, the known distances of the surface points from the mouth of the bore and the known distances of the points in the bore from the mouth of the bore.

In testimony whereof, I have signed my name to this specification.

ESME EUGENE ROSAIRE.